United States Patent [19]
Schmid et al.

[11] Patent Number: 4,719,887
[45] Date of Patent: Jan. 19, 1988

[54] CONTROL ARRANGEMENT FOR A FUEL INJECTION SYSTEM

[75] Inventors: Friedrich Schmid; Karl Maderthaner, both of Stuttgart, Fed. Rep. of Germany

[73] Assignee: Daimler-Benz Aktiengesellschaft, Stuttgart, Fed. Rep. of Germany

[21] Appl. No.: 728,028

[22] Filed: Apr. 29, 1985

Related U.S. Application Data

[63] Continuation of Ser. No. 386,070, Jun. 7, 1982, abandoned.

[30] Foreign Application Priority Data

Jun. 5, 1981 [DE] Fed. Rep. of Germany ....... 3122333

[51] Int. Cl.$^4$ ............................................. F02M 39/00
[52] U.S. Cl. ..................................... 123/383; 123/369; 123/357; 60/603
[58] Field of Search ............... 123/357, 358, 359, 383, 123/369, 480; 60/603

[56] References Cited

U.S. PATENT DOCUMENTS

| | | | |
|---|---|---|---|
| 3,903,852 | 9/1975 | Sola | 123/369 |
| 4,200,076 | 4/1980 | Straubel | 123/369 |
| 4,301,780 | 11/1981 | Hoshi | 123/480 |

FOREIGN PATENT DOCUMENTS 595627  12/1947  United Kingdom ................. 60/603

Primary Examiner—Carl S. Miller
Attorney, Agent, or Firm—Barnes & Thornburg

[57] ABSTRACT

A control arrangement for a fuel-injected supercharged internal engine and, in particular, a diesel engine, with the control arrangement including a fuel injection pump. A control unit is provided for adjusting a fuel output of the fuel injection pump in dependence upon the combustion air delivered to the supercharger. To optimize the measurement of combustion air, the control unit is adapted to be influenced by instantaneous operating parameters such as the rotational speed of the internal combustion engine and rotational speed of the supercharger.

6 Claims, 1 Drawing Figure

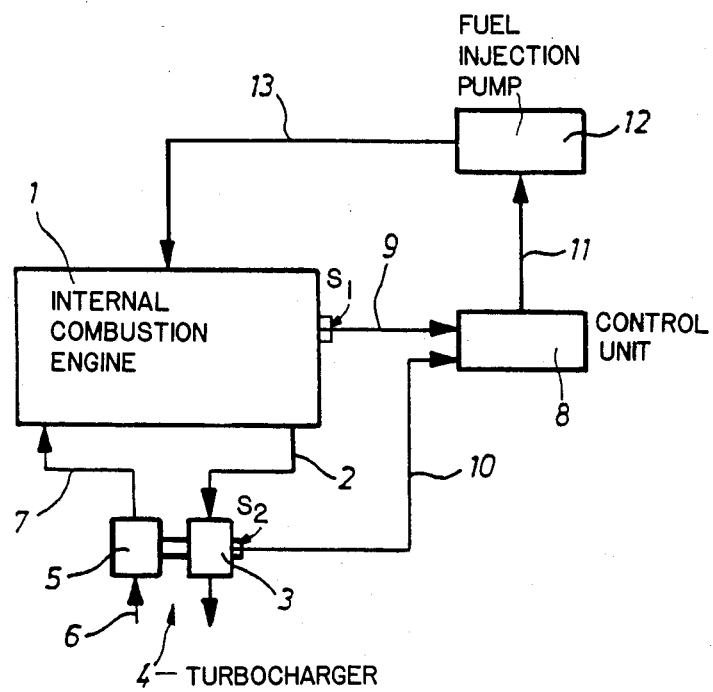

CONTROL ARRANGEMENT FOR A FUEL INJECTION SYSTEM

This is a continuation of application Ser. No. 386,070, filed June 7, 1982, now abandoned.

The present invention relates to a control arrangement and, more particularly, to a control arrangement for a supercharged fuel injected internal combustion engine, especially a diesel engine, wherein an output of the fuel injection pump means is adapted to be controlled by a control means in dependence upon a volume of combustion air delivered by a supercharger.

In, for example, Offenlegungsschrift No. 3,036,862, a drive unit includes a supercharged diesel engine and a fuel injection pump means, wherein a minimum mount or quantity of combustion air fed by the supercharger or a minimum about or quantity supplied by the fuel injection pump to the diesel engine corresponds to the quantities required for a clean intake operation of the engine, with the amount of fuel output of the injection pump being adjusted by a control device in dependence upon an amount or quantity of the combustion air delivered by the supercharger. One disadvantage of this proposed construction resides in the fact that there is no indication as to any specific manner for measuring the amount of air.

The aim underlying the present invention essentially resides in providing a control arrangement for a fuel-injected supercharged internal combustion engine wherein it is possible to accurately and in a simple manner measure the amount of air.

In accordance with advantageous features of the present invention, a control means is provided for controlling the output of the fuel injection pump in dependence upon the quantity of air delivered by the supercharging means, with the control means being influencable by instantaneous operating parameters of the engine such as, for example, rotational speed of the engine and rotational speed of the supercharger.

Advantageously, in accordance with further features of the present invention, the control means includes a digital electronic means in the form of a read-only memory (ROM) in which the several parameters and corresponding preset values for air volume flow are correlated with specific engine performance characteristics, with the control means providing an apporpriate control signal regulating the quantity of air supplied to the fuel injection pump means in dependence upon the sensed parameters.

It is also possible in accordance with the present invention for a value of an air volume flow which is preset in terms of engine performance characteristics to be constructed as a three-dimensional cam means.

Accordingly, it is an object of the present invention to provide a control arrangement for a fuel injection system which avoids, by simple means, shortcomings and disadvantages encountered in the prior art.

A further object of the present invention resides in providing a control arrangement for a fuel injection system of a supercharged internal combustion engine, which enables an optimization of performance characteristics of the engine.

Yet another object of the present invention resides in providing a control arrangement for a fuel injected supercharged internal combustion engine which functions reliably under all operating load conditions of the engine.

A still further object of the present invention resides in providing a control arrangement for a fuel injection system which enables a simple and accurate measurement of a quantity of air delivered to the fuel injection system.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a schematic view of the control arrangement constructed in accordance with the present invention for an internal combustion engine equipped with an exhaust gas turbocharger means.

Referring now to the single FIGURE of the drawing, according to this figure, a supercharged internal combustion engine 1 includes an exhaust gas line 2 for directing a supply of exhaust gases to a turbine 3 of an exhaust gas turbocharger 4. A supercharger 5 of the exhaust gas turbocharger 4 is adapted to supply intake air 6 through a supercharging inlet line 7 to the internal combustion engine 1.

A sensor generally designated by the reference character $S_1$, of conventional construction, is arranged on the engine 1 for measuring or sensing the instantaneous rotational speed of the engine 1 and for providing an output signal 9 of the sensed rotational speed to a control means 8. A further sensor generally designated by the reference character $S_2$, of conventional construction, is arranged at the exhaust gas turbocharger 4 for meansuring or sensing the instantaneous rotational speed of the exhaust gas turbocharger 4 and for providing an output signal 10 to the control means 8. The rotational speeds of the internal combustion engine 1 and exhaust gas turbocharger 4 represent the operating parameters for determining the air mass or volume to be supplied to a fuel injection pump 12.

The control means 8 regulates the quantity or volume of the air 11 supplied to the fuel injection pump 12, with the air mass being determined in a conventional manner by considering the air density.

From the operating parameters sensed by the sensors $S_1$, $S_2$ and supplied to the control means 8, the instantaneous air flow is determined from performance characteristics specific to the internal combustion engine 1, and the regulated quantity or volume of air mass is fed to the fuel injection pump means 12, which adapts the fuel mass to the supplied air mass.

The control means 8 may, for example, employ a digital electronic means including a read-only memory (ROM), wherein the sensed parameters and corresponding preset air volume flow values are correlated in terms of performance characteristics by the digital electronic means. In this manner, a value of the air volume flow which is preset in terms of performance characteristics may be constructed as a three dimensional cam.

While We have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A control arrangement for a fuel-injected supercharged internal combustion engine, the control arrangement comprising a fuel injection pump means, a control means for adjusting an output of fuel injection pump means, and means for sensing instantaneous operating parameters of the engine and a supercharging means and for supplying output signals of the sensed parameters to the control means whereby the fuel injection pump means is controlled in dependence upon the instantaneous sensed parameters and quantity of combustion air supplied by the supercharging means, and wherein the sensed parameters are an instantaneous rotational speed of the engine and an instantaneous rotational speed of the supercharging means.

2. A control arrangement according to claim 1, wherein the control means includes a digital electronic means and a read-only memory for correlating the sensed parameters and corresponding preset values of an air volume flow associated with specific engine performance characteristics.

3. A control arrangement according to claim 2, wherein the value of the preset air mass flow is embodied in a three dimensional cam.

4. A control arrangement according to claim 1, wherein the engine is a diesel engine.

5. A control arrangement according to claim 4, wherein the control means includes a digital electronic means and a read-only memory for correlating sensed parameters and corresponding preset values of an air volume flow associated with specific engine performance characteristics.

6. A control arrangement according to claim 5, wherein the value of the preset air volume flow is embodied in a three dimensional cam.

* * * * *